United States Patent

[11] 3,626,383

[72] Inventors William A. Oswald;
Frank Y. Shaw, both of Rochester; Lloyd H. Yost, Honeoye Falls, all of N.Y.

[21] Appl. No. 880,168
[22] Filed Nov. 26, 1969
[45] Patented Dec. 7, 1971
[73] Assignee Stromberg-Carlson Corporation Rochester, N.Y.

[54] PROCESS FOR AUTOMATIC SYSTEM MAINTENANCE
12 Claims, 10 Drawing Figs.

[52] U.S. Cl. 340/172.5, 179/175.2 R
[51] Int. Cl. G06f 11/04
[50] Field of Search 340/172.5, 146.1; 179/175.2, 175.25

[56] References Cited

UNITED STATES PATENTS

| | | | |
|---|---|---|---|
| 3,064,090 | 11/1962 | Hersey | 179/175.25 |
| 3,299,220 | 1/1967 | Wedmore | 179/175.2 |
| 3,435,159 | 3/1969 | Brooks et al. | 179/175.2 |

*Primary Examiner*—Raulfe B. Zache
*Attorney*—Craig, Antonelli and Hill

ABSTRACT: Process for automatically testing the links and components of a multistage telephone switching network for determining the continuing proper operation thereof and for indicating the presence, location and type of malfunctions which are detected.

Figure 1:
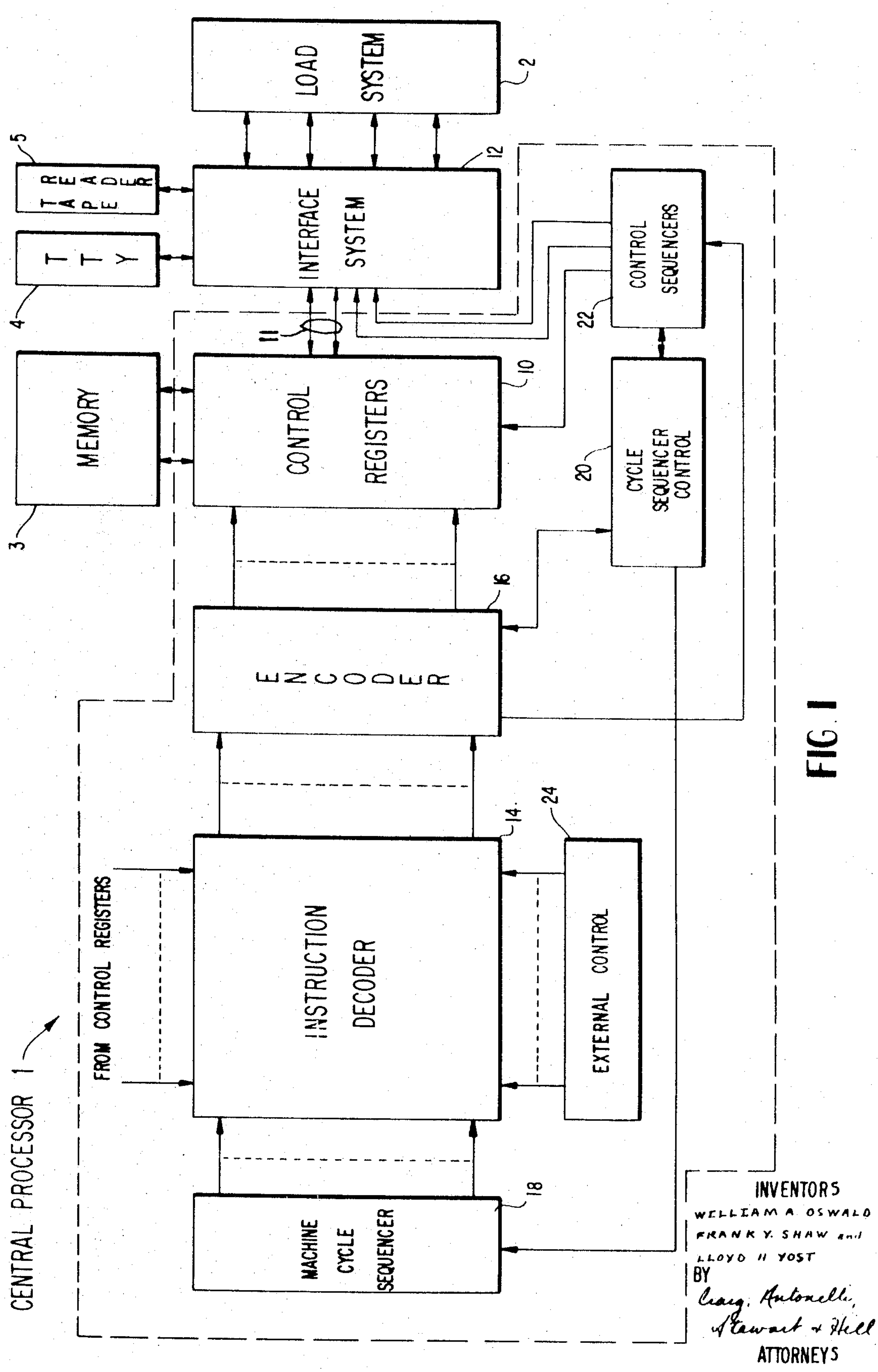

INVENTORS
WILLIAM A. OSWALD
FRANK Y. SHAW and
LLOYD H. YOST
BY
Craig, Antonelli, Stewart & Hill
ATTORNEYS

SCAN ROUTINE

TIME ROUTINE

PROCESS FOR AUTOMATIC SYSTEM MAINTENANCE

The present invention relates in general to data processing systems and more particularly to a process for automatically monitoring and testing operation of an electronic telephone system employing stored program techniques.

Upon completion of the setup of the switching network in an automatic telephone exchange, it is essential to check each of the links between the various subscriber line circuits through the respective stages of the network to the various junctors and trunks to determine that all connections are properly made and thereby insure that misoperation of the system will not occur. This has been accomplished in the past by a manual step by step process of checking each individual link and successively establishing various paths through the network from subscribers to junctors and trunks, and back to subscribers to simulate all of the possible interconnections through the system which will be established during the use thereof. However, with the increased complexity of such switching networks, such a process of checking the electrical interconnections therein and operability of the various components has become an extremely complex and time-consuming process.

In addition, it is extremely important when providing customer directed services to insure a high degree of reliability of operation at all times on a continuous basis. As a result, great efforts have been made toward detecting errors and malfunctions in the switching equipment as soon as possible after the occurrence thereof and in the provision of means for quickly detecting the source of such malfunctions so as to provide for rapid repair and restoration of complete operability to the system within the shortest possible time. Obviously the most desirable maintenance arrangement for such systems would be one which provided continuous surveillance over the equipment so that malfunctioning of various portions or elements thereof could be detected at the soonest possible time. In addition, it would also be of unquestionable value to provide a maintenance system in which faulty equipment could be detected prior to its actual use in the system thereby avoiding a malfunction before it can occur. However, due to the increased size, speed and complexity of data processing systems, and electronic telephone exchanges in particular, such continuous maintenance has not only been impractical, but impossible within the present state of the art.

It is therefore an object of the present invention to provide a process for maintaining surveillance over an automatic telephone exchange in an automatic manner to detect the presence of faulty components and connections in the system.

It is another object of the present invention to provide a process for surveillance of an automatic telephone exchange to insure reliable operation on a continuous basis.

The objective of the process in accordance with the present invention is to establish in connection with an electronic telephone switching system successive line to line and line to junctor/trunk connections via all junctors, trunks and links through the various stages of the switching network to determine that all cross-points in the network are functioning satisfactorily. In the event of a malfunction, it is a further objective of the process to cause the line-trunk-junctor-link identities involved in the faulty connection to be printed out so as to provide a visual indication of the fault and location thereof.

The present invention is directed more particularly to an electronic telephone exchange controlled by a data processor utilizing stored program techniques wherein a memory stores a plurality of programs of instructions necessary to control the operation of the telephone exchange, which control is effected in accordance with these programs of instruction through control by a central processor which analyzes data received from the telephone exchange, determines the necessary operations required in view of the data so received, effects the necessary control in accordance with the programs of instructions stored in the memory, and provides to the telephone exchange the necessary control signals to carry out the required operation. Such a stored program telephone control system is disclosed, for example, in the copending application Ser. No. 880,110, filed Nov. 26, 1969, and assigned to the same assignee as the present application.

In accordance with one advantageous feature of the process in accordance with the present invention all of the connections via all junctors and links in the various combinations which determine paths through the switching network are sequentially automatically tested in accordance with a route map or layout plan stored in memory. Thus, the testing of all combinations of paths through the switching network can be effected quickly and efficiently either in a continuous manner, or in an intermittent manner during offline periods.

Another advantageous feature of the process in accordance with the present invention is the timing of the operating condition of various components in the switching exchange to detect the malfunction thereof. Thus, connection and release times of the various switching network relays can be tested to detect improper operation thereof, and also malfunctions in various peripheral control systems can be identified by detecting associations of this equipment with certain portions or components of the switching exchange or operation thereof for abnormal lengths of time.

A particularly advantageous feature of the present invention results from the fact that upon detection of a malfunction in the switching exchange, both the identity of the malfunction and the approximate location thereof is visually presented in coded form so that immediate detection and maintenance of the equipment can be effected. This coupled with the ability to test the equipment on a continuous basis enables detection and correction of the errors before the faulty equipment can undesirably affect the operation of the system.

Figure 2A:
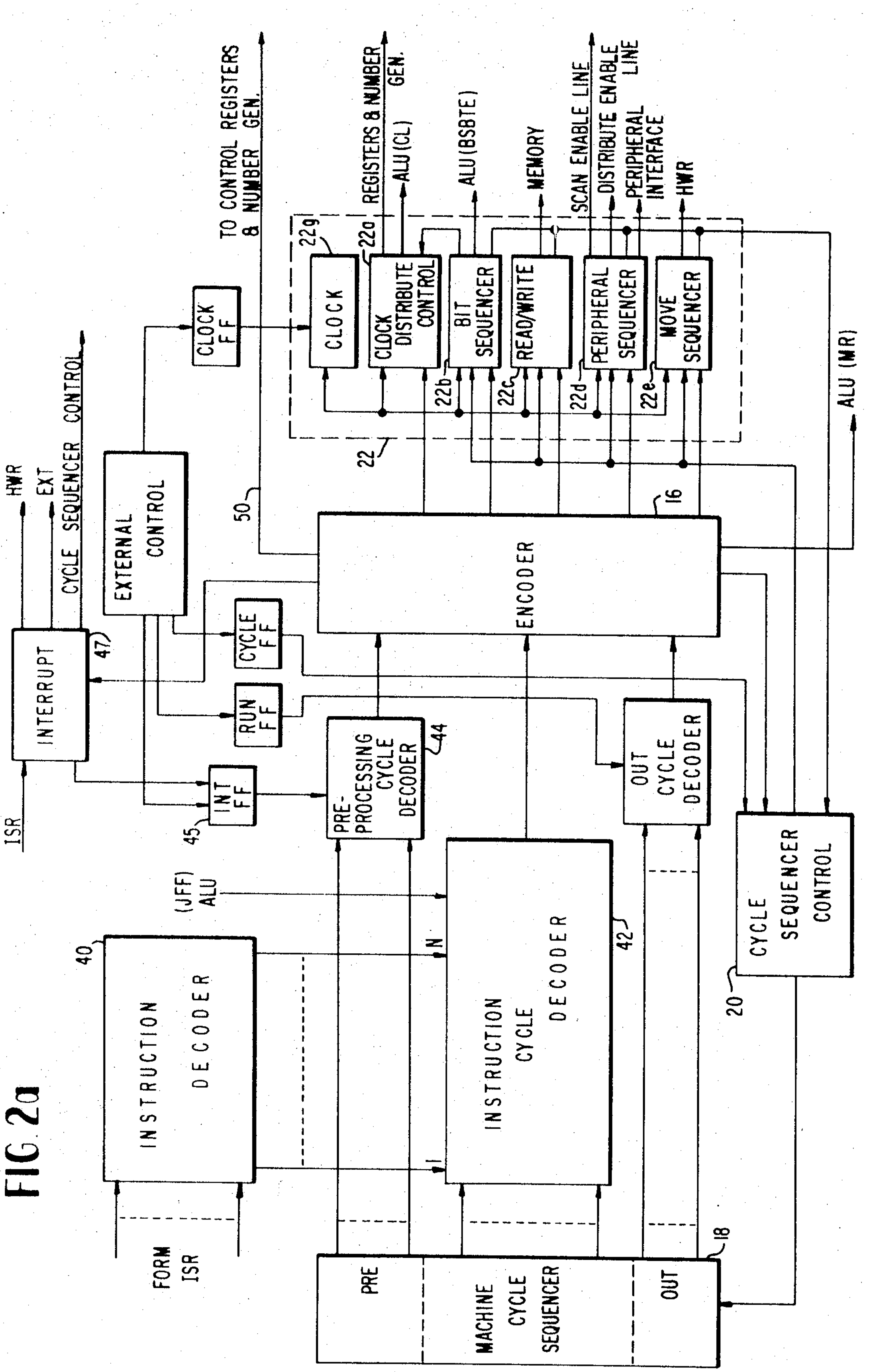
Figure 2B:
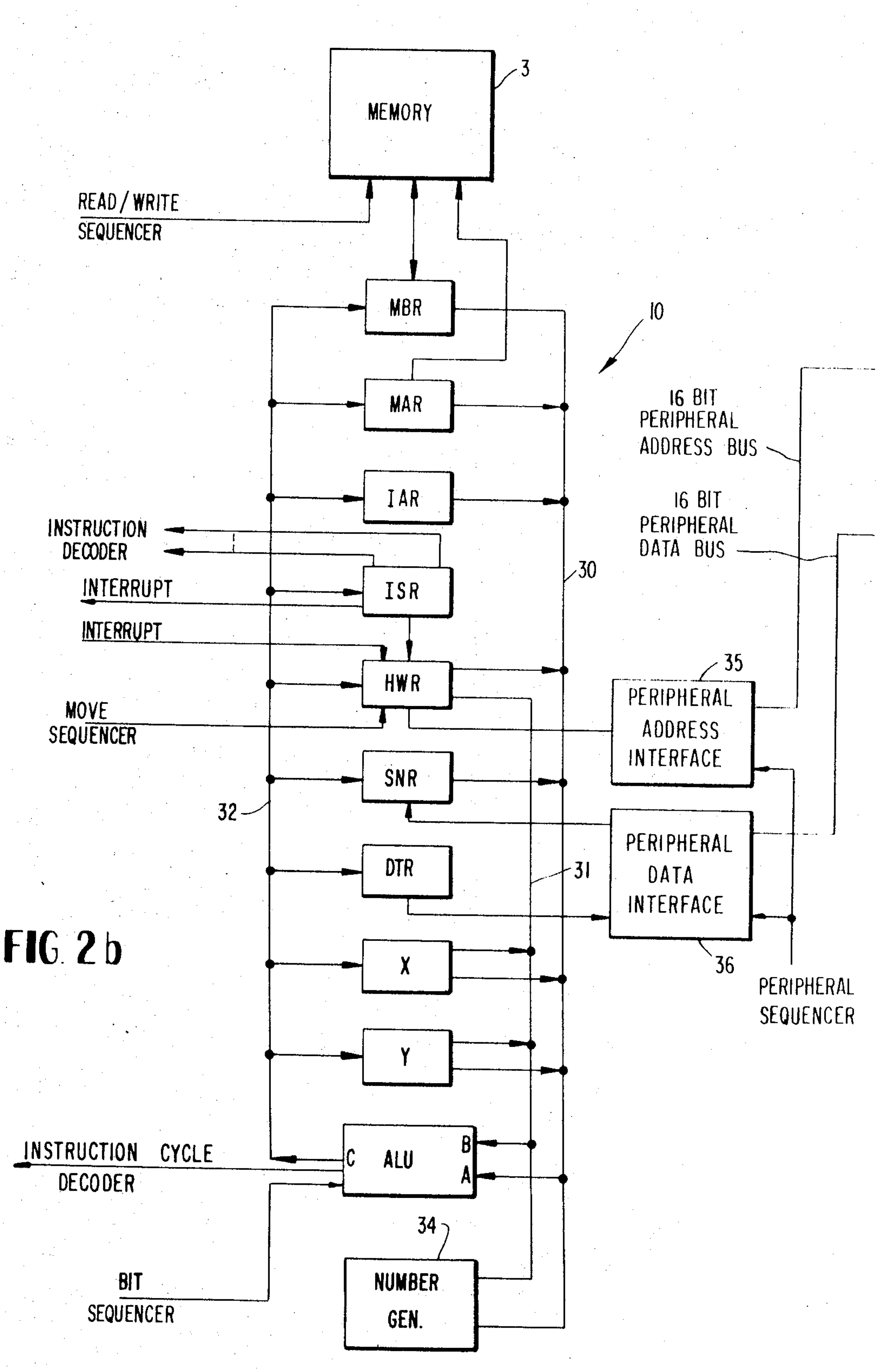
Figure 2C:
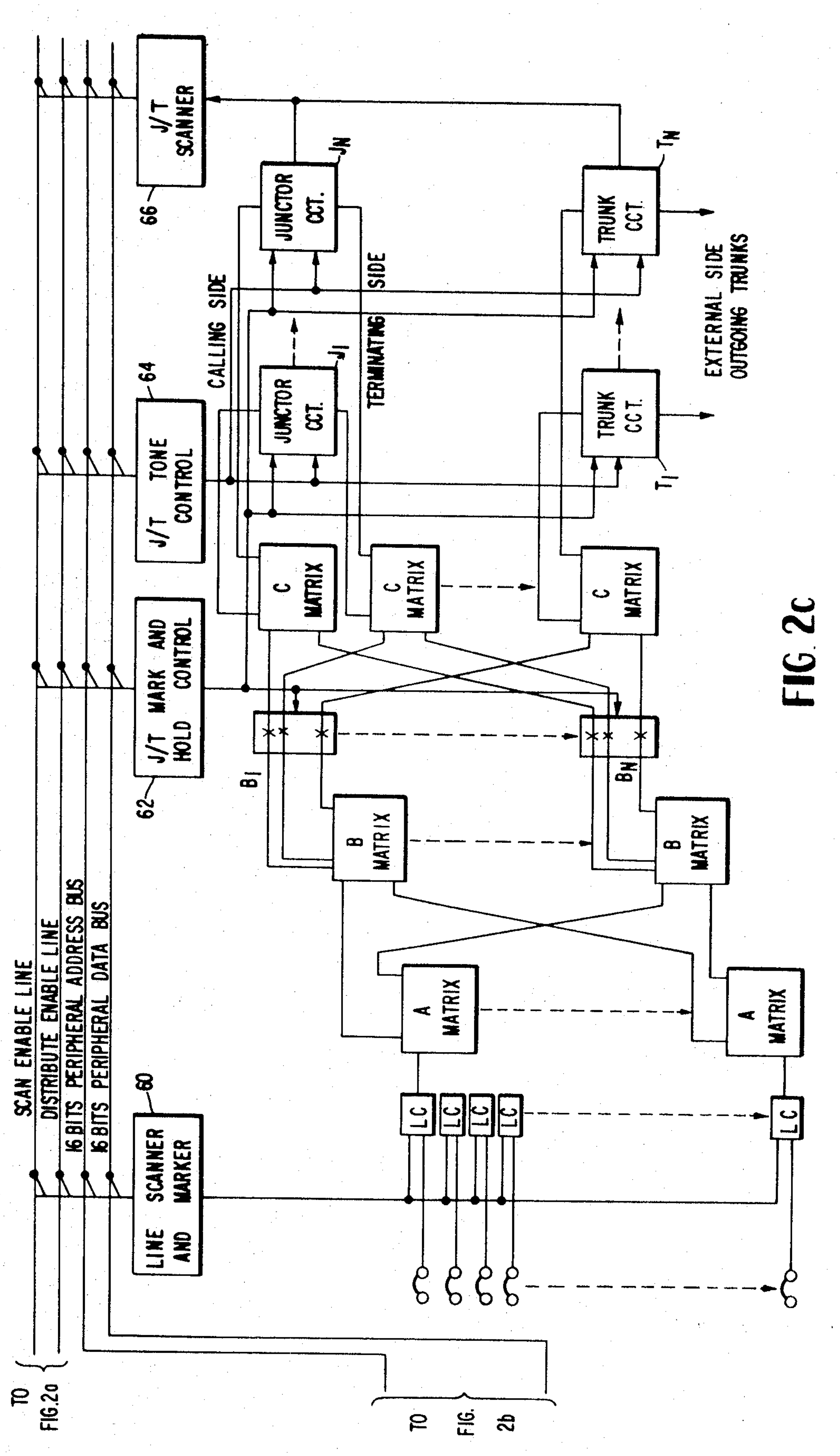
Figure 3A:
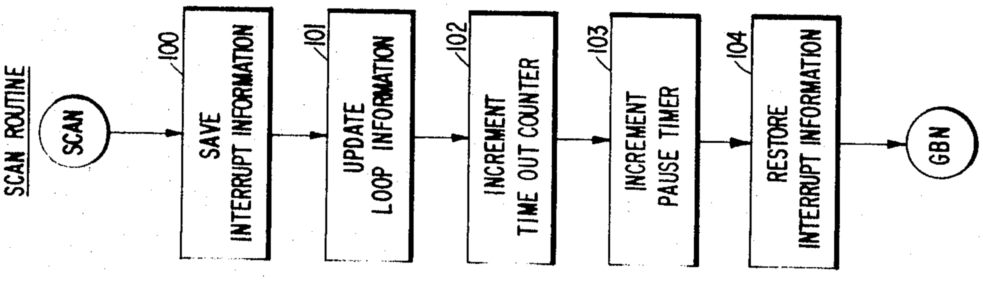
Figure 3B:
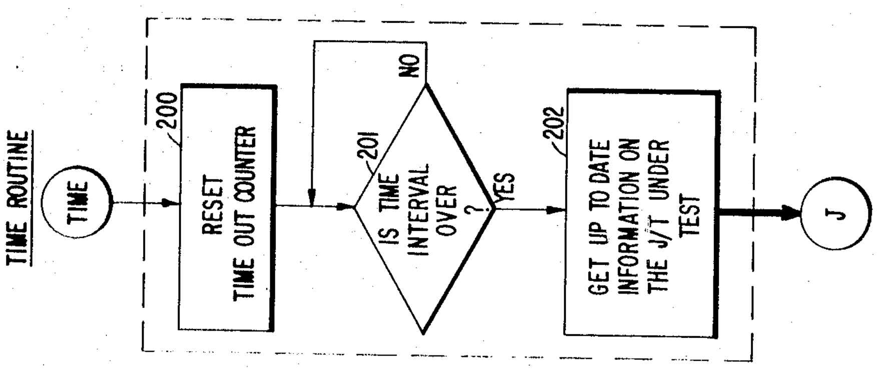
Figure 4:
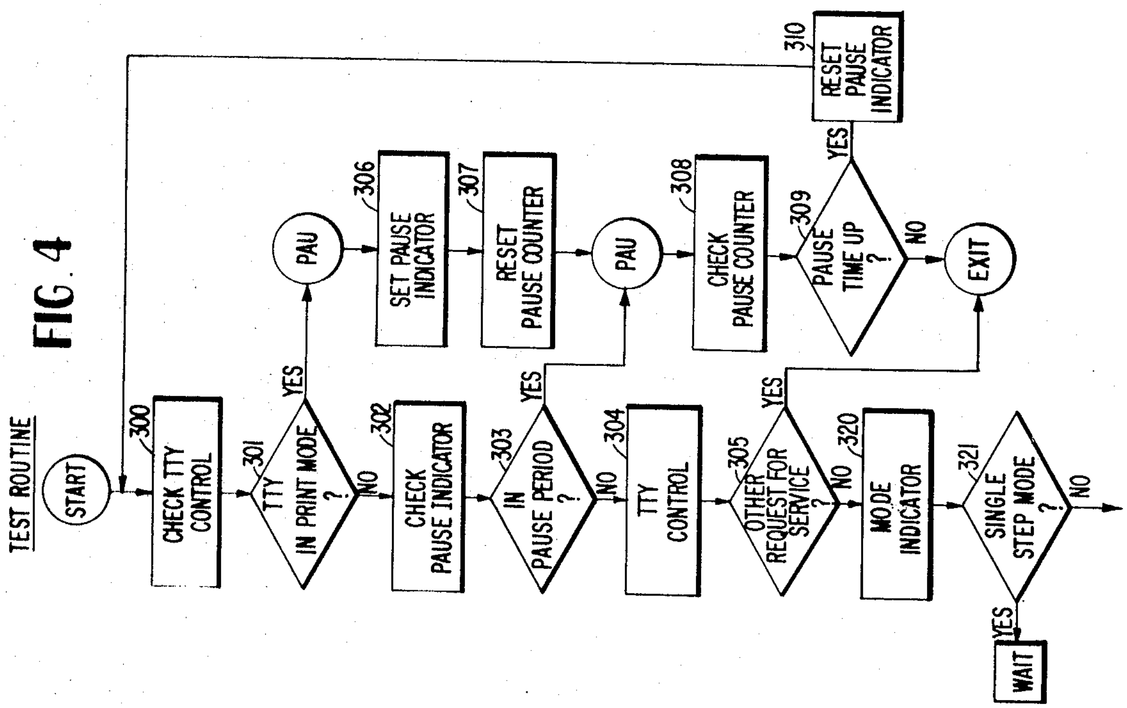

These and other objects, features and advantages of the present invention will become more apparent from the following detailed description thereof, when taken in conjunction with the accompanying drawings, wherein:

FIG. 1 is a schematic block diagram of an automatic data processing system to which the process in accordance with the invention is applicable;

FIGS. 2*a*, 2*b* and 2*c*, when combined, provide a more detailed schematic diagram of the system of FIG. 1, as provided in control of a telephone exchange;

FIG. 3*a* is a flow chart of the scan routine forming part of the present invention;

FIG. 3*b* is a flow chart of the time routine forming part of the present invention; and FIGS. 4 through 7, when combined, provide a flow chart of the test routine forming part of the present invention.

The following description relates an exemplary embodiment of the invention to the control of a telephone exchange; however, it will be apparent from this description that the present invention is equally applicable to control of other systems without loss of advantage or the necessity of material change or alteration beyond that obvious to one of ordinary skill in the art.

In the basic block diagram of FIG. 1, a central processor 1 operates to provide the necessary control signals for controlling the load system 2 in accordance with the conditions existing in the load system, which are detected and stored in the memory 3, and pursuant to a set of instructions forming one or more programs also stored in the memory 3. The introduction of data into the central processor is accomplished through use of, for example, a teletype unit 4 and a tape reader 5, which permit the introduction or alteration of programs and individual instructions and make possible the interruption of the operation of the central processor for purposes of introducing special requests for service as required.

The central processor 1 consists of a combination of elements which analyze data received from the load system, determine from the instructions stored in the memory 3 the necessary steps required in view of the analyzed data, determine the sequence of steps to be performed within the selected instruction and generate the necessary control signals for application in control of the load system 2. Data is transferred to the load system 2 by way of a series of control registers 10, a peripheral bus 11 and an interface system 12. The series of control registers 10 provide the means for introducing into or deriving data and instructions from the memory 3 and include the necessary registers and computing elements for performing analysis on the data derived from the load system 2 and from the memory 3 in accordance with the programs stored in the memory 3 and for generating the necessary control signals which are applied through the peripheral bus 11 interface system 12 in control of the load system 2.

Operation of the control registers 10 take two basic forms, that is, an instruction or instructions derived from the memory 3 in coded form indicating the necessary control required for a given set of circumstances must be decoded to a form representing a plurality of individual operative steps through which the various control registers are driven so as to achieve the desired output control to the load system 2 and the proper sequence of the required steps must be determined and the operation of the individual control registers must be regulated in accordance with this predetermined sequence. Accordingly, the central processor 1 includes an instruction decoder 14 which receives a coded instruction from the control registers 10 and decodes this coded instruction by providing a series of outputs representative of a plurality of individual operation cycles which make up the given instruction. These operation cycles in turn consist of a plurality of steps which are determined by an encoder 16 connected to the output of the instruction decoder 14. Outputs representing the individual steps of each cycle forming an instruction are then applied from the encoder 16 to the control registers 10 in control thereof.

The sequence in which the respective steps of each cycle of a given instruction are applied to the control registers 10 is determined by a machine cycle sequencer 18 under control of a cycle sequencer control 20. The machine cycle sequencer 18 determines the sequence of the outputs enabled from the instruction decoder 14 and effectively steps from one cycle to the next cycle in sequence upon indication from the cycle sequencer control 20 that all of the steps of a given cycle have been completed so that the next cycle may be initiated. The cycle sequencer control 20 also controls a plurality of control sequencers 22 in response to control signals received from the encoder 16, the control sequencers 22 providing for control operation of the control registers 10 and interface system 12 as required for the various steps of the cycles of a given instruction.

The general control system of FIG. 1 is illustrated in greater detail in connection with FIGS. 2*a*, 2*b* and 2*c*, which together provide a system for effecting control over the operation of a telephone exchange. Looking first to FIG. 2*b*, which illustrates the control registers 10 associated with the memory 3, it is seen that nine registers are provided for the manipulation and control of data and instructions, and an arithmetic an logic unit ALU is provided for transfer and computation of the data as required by the stored instructions.

The control registers include a memory address register MAR which is primarily used to present an address to the memory 3 indicating the storage position in the memory into which data is written or from which data is written or from which data is derived. There is also provided a memory buffer register MBR which stores the data to be inserted into the memory or extracted therefrom at the memory position determined by the address stored in the memory address register MAR. In order to write into the memory, the address is transferred into the memory address register MAR and the contents to be written into the memory are transferred into the memory buffer register MBR. Then, control from the read/write sequencer effects the necessary transfer of data into the memory at the proper memory location. To read data from the memory, a similar operation occurs with the data being extracted from the memory at the location determined by the address in the memory address register MAR, the data being transferred to the memory buffer register MBR upon application of control to the memory from the read/write sequencer.

The control registers also include an instruction address register IAR which contains the address of the instruction about to be executed or the address of the instruction which has just been executed. This register is provided in association with the instruction register ISR which contains the instruction being executed, which instruction is derived from the series of instructions forming the plurality of programs stored in the memory 3.

A hardware register HWR performs a plurality of functions including the storage of instructions received in parallel from the instruction register ISR for various operations and the storage of the address of peripheral equipment and certain information relating to interrupts.

As indicated above, when the contents of an address in the memory is desired, a read command is given. Similarly, when the status of a peripheral device is desired, a scan command is given. The address of the desired peripheral device is first placed into the hardware register HWR and then gated through a peripheral address interface 35 to present the address to the peripheral address decoder in the interface equipment. Upon sending out the scan pulse or command from the peripheral sequencer forming another of the control sequencers 22, the status of the peripheral device appears on the peripheral data bus and is entered through a peripheral data interface 36 into the scan register SNR. On the other hand, when data is to be sent to a peripheral device, the address of the peripheral device is placed in the hardware register HWR and the data to be sent to the peripheral device is placed in a distribute register DTR. Upon generation of a distribute pulse by the peripheral sequencer the data stored in the distribute register DTR is then outpulsed to the peripheral equipment.

Finally, the control registers include a pair of programable or addressable registers X and Y, which registers are utilized for the various operations specified in the stored programs, with the execution of instructions not serving to change the contents of these registers unless the instruction explicitly indicates that change of the contents is required.

The arithmetic and logic unit ALU is a unit which performs the necessary arithmetic and logic functions attendant to the carrying out of the programs stored in the memory. This unit includes two data inputs designated A and B and a single data output designated C. There are two buses 30 and 31 that lead to the unit ALU, with one of the buses connecting the output of various registers to the A input and the other bus 31 connecting various registers to the B input to the unit. Thus the flow of data generally from and to the various control registers occurs in a clockwise manner via the buses 30 or 31 to the inputs A or B of the unit ALU and out the outputs C via the bus 32 to the input of the registers. In this regard, it should be noted that the instruction register ISR and the distribute register DTR are not connected to either input of the unit ALU. Data is never transferred serially out of the instruction register ISR but is transferred in parallel to the instruction decoder or to the hardware register HWR. With regard to the distribute register DTR, since this register is used only to distribute information to the peripheral data bus in parallel, no data is transferred serially out of this register. With the exception of the hardware register HWR, the scan register SNR and the memory buffer register MBR, registers can only be loaded by serially transferring data through the arithmetic and logic unit ALU.

There is also included in combination with the control registers a number generator 34 which is connected to the data buses 30 and 31 and is used to date certain numbers into the inputs A or B of the unit ALU when requested by the encoder 16.

FIG. 2*a* provides the instructor decoder/encoder and timing arrangement for the processor 1. This section tells the central control and the control registers shown in FIG. 2*b* what they are supposed to do and when they are supposed to do it. The contents of the instruction register which represent an instruction in a binary code are applied to the instruction decoder 40 which decodes the instruction by enabling one out of N leads that goes to the instruction cycle decoder 42. Each of the output leads 1-N of the instruction decoder 40 therefore represents a single unique one of the instructions forming the various programs stored in the memory. As indicated previously, each instruction includes one or more cycles of operating functions with each cycle being broken down into one or more operating steps. Thus, the first step in determining the required operations which must be performed in response to a particular instruction is to determine the sequence of cycles required for the particular instruction. The instruction cycle decoder 42 determines those cycles which make up a particular instruction in response to receipt of an enabling signal on one of the lines 1-N from the instruction decoder 40.

Since each cycle of an instruction must be performed in a particular sequence, the main suction of the machine cycle sequencer 18 provides a plurality of outputs to the instruction cycle decoder 42, which output leads are enabled sequentially in response to control from the cycle sequencer control 20 so that the output from the instruction cycle decoder 42 will represent control information as to each cycle of the particular instruction in its particular order or sequence. The encoder 16 connected to the output of the instruction cycle decoder 42 then determines from the information received at its input the particular steps of each cycle which must be performed. Thus, the encoder determines what steps are to be performed (such as enable the X register to the A input of the arithmetic and logic unit ALU, tell the arithmetic and logic unit ALU to transfer, and enable the C output to the Y register) and these instructions are generated by the encoder in the sequence determined by the control sequencers 22 until control of the cycle sequencer control 20.

There is some work at the start of an instruction that is identical for all instructions. As an example, the instruction when read from memory must be transferred from the memory buffer register MBR into the instruction register ISR. This is accomplished by a preprocessing cycle which is performed primer to actual carrying out of any instruction. Thus, the machine cycle sequencer 18 contains a section designated PRE which provides the sequence of steps to carry out the preprocessing cycle. The output of this PRE section of the machine cycle sequencer 18 is connected to a preprocessing cycle decoder 44 which determines the various cycles of the preprocessing instruction. The output from the preprocessing cycle decoder 44 is connected to the encoder 16 which then determines the individual steps of each cycle of the preprocessing instruction in the same manner as the other instructions derived through the instruction cycle decoder 42.

In the same manner, certain work is common at the end of every instruction; for example, the next instruction in the stored program must be read. This is accomplished by the Out instruction, and since this instruction is provided after completion of one of the general instructions, the machine cycle sequencer 18 provides a section designated OUT which is connected through an OUT cycle decoder 45 to the encoder 16 which then determines the individual steps of each cycle of the OUT instruction.

Thus, the machine cycle sequencer is provided in such a way that a preprocessing instruction is always carried out prior to a general instruction and an OUT instruction is always carried out at the conclusion of a general instruction. The machine cycle sequencer 18 therefore steps progressively through the preprocessing instruction, a general instruction and then the OUT instruction with each step being initiated through control from the cycle sequencer control 20.

The output lead 50 from the encoder 16 represents a plurality of control leads which extend to various gates and control elements in the control registers illustrated in FIG. 2*b*. Thus, in accordance with the particular steps of each cycle of a given instruction, the various gates and registers may be enabled to perform the necessary functions required by the instruction. In addition, outputs from the encoder 16 are provided to the control sequencers 22 which include a clock distribute control 22*a*, a bit sequencer 22*b*, a read/write sequencer 22*c*, a peripheral sequencer 22*d* and a move sequencer 22*e*. Each of the control sequencers 22*a*–22*e* are enabled from the cycle sequencer control 20 so that each performs its required function as determined by the outputs from the encoder 16 in particular sequence or order.

The control sequencers 22*a*–22*f* generally provide for an indexing or outpulsing of data from one register to another or to or from the memory under control of the clock 22*g* which is connected to each of these sequencers. For example, the clock distribute control 22*a* applies clock pulses to all of the registers and the number generator. The bit sequencer 22*b* is connected to the ALU circuit to tell the ALU circuit when to test a required bit and is connected to the clock distribute control 22*a* to control the serial operation of all the bits in the registers. The read/write sequencer 22*c* is connected to the memory and serves to effect a transfer of data or instructions thereto or therefrom.

The peripheral sequencer 22*d* applies the contents of the HWR Register to the peripheral address bus during the entire period data is to be distributed to, or received from, the load 2, by applying a control signal to actuate the peripheral address interface 35. During distribute period, the peripheral sequencer 22*d* applies a control signal to actuate the peripheral data interface 36 to continuously transmit the data stored in the DTR Register to the peripheral data bus. During the middle of the distribute period, the peripheral sequencer 22*d* generates a distribute enable pulse on the distribute enable line that enables the peripheral devices to act on the address and data being transmitted. In the scan period (receiving information from the load), the peripheral sequencer 22*d* generates the scan enable pulse during the middle of the period so that the peripheral unit addressed gates data on the peripheral data bus. At the trailing edge of the scan enable pulse, the peripheral data interface 36 is enabled by the peripheral sequencer 22*d* to transmit the data from the peripheral data bus to the SNR Register.

A move sequencer 22*e* generates a reset pulse and enables one clock pulse to the HWR Register that causes the parallel entry of information into the HWR Register.

The interrupt control 47 provides a means through which the processor program can be interrupted at the beginning of the next following instruction after presence of an interrupt signal has been detected. The processor is caused to execute a special program to service the interrupts. Upon completion of the interrupt program, the processor returned to complete the execution of the main program.

Turning now to FIG. 2*c* which schematically provides a telephone switching network in conjunction with the required interface system equipment necessary for applying control signals to the network and deriving supervisory data from the network. The interface system allows very flexible control of the telephone switching network through the use of a stored program control system, this flexibility being due to the absence of any logic or decisionmaking equipment in the network or interface, as opposed to normal switching systems which employ "wire logic." The interface system has two functions, that it provides for a change in the configuration of the network as commanded by the processor and keeps the processor informed of subscriber initiated network conditions (open/closed loops, dialing, etc.). These tasks are performed by the line scanner and marker 60, a junctor/trunk mark and hold control 62, a junctor/trunk tone control 64 and a junctor/trunk scanner 66.

The A, B and C network stages are composed of conventional telephone relay matrices, and the general makeup of the network illustrated is provided only by way of example, other known configurations being equally applicable for control in accordance with the present invention. A connection from a subscriber line to a junctor $J_1$ through $J_n$ or trunk $T_1$ through $T_n$ is established by closing a B–C link, marking the line, and marking the junctor or trunk. Note that these three variables determine a unique path. A relay is energized at each matrix cross-point of the path which is marked, and holding relays in the junctors and trunks provide a holding current, so that the marked connection is maintained after removal of the mark signals.

The connection which links the interface system 12 with the processor consists of a 16-line peripheral address bus, a 16-line peripheral data bus, a scan enable line and a distribute enable line. These lines and buses are connected to the respective markers and scanners in the interface system equipment for purposes of applying control pulses and data to the switching network and deriving supervisory information from the network for application to the processor.

As instructed by the line/trunk scan portion of the program stored in the memory, the processor interrogates the line scanner and marker 60 (at time intervals dependent upon traffic) by scanning the address assigned to the scanner. The processor places this binary number onto the 16 address leads of the peripheral address bus, then pulses the scan lead with a logic number 1. Since each unit of the interface system is assigned a unique address, only the line scanner and marker 60 will respond to the scan pulse. If the scanner is stopped (has found an off-hook line), the line number on which it stopped is gated onto the data portion of the peripheral bus. This data is then applied to the scan register where it is stored for further processing or storage.

Having been appraised that a subscriber has requested service and having the address of the calling subscriber, the processor seeks a free junctor circuit for connection to the calling line circuit from data stored within the memory 3. All of the junctors and trunks are scanned periodically via the scanner 66 so that a constant record of the busy-free condition of each of these elements is recorded and stored in the memory. Thus, when it is necessary to obtain a junctor or trunk circuit an examination of the appropriate data area in the memory will indicate which junctor or trunk is available for service.

A free junctor is seized by the mark and hold control 62 in accordance with the data obtained as to the busy-free condition of the junctors from the memory. The processor will instruct circuit 62 which of the B–C links $B_1$ through $B_n$ to close to provide a unique path between the subscriber and the selected junctor circuit. Once the path between the subscriber and junctor is complete, as determined by the condition of the supervisory relay in the junctor circuit, dial tone is applied from the tone control circuit 64 through the junctor back to the subscriber indicating that the system is prepared to accept dial pulse information. Constant scanning of the supervisory relay in the junctor circuits then provides the indication of dial impulses received in the junctor circuit, which impulses are analyzed by the processor to determine the destination of the requested call. If it is determined that an outgoing trunk circuit is required, the necessary switching of the subscriber line to an available trunk circuit is effected much in the same way as the junctor circuit is obtained, and this operation is carried out during an interdigit pause in the dialing.

The connection from a junctor circuit back through the switching network to a terminating subscriber line circuit occurs much in the same way with the address of the subscriber being applied to the line scanner and marker 60 so that the line circuit is marked. The mark and hold control 62 then provides for connection of a path from the terminating line circuit through to the junctor circuit thereby establishing a connection between the calling subscriber and the terminating subscriber through the switching network.

Clearly, if there is a malfunction of the scanner and marker 60, the mark and hold control 62, the junctors, trunks, B–C links or cross-points in the switching stages, or an improper connection of these elements, a malfunction of the equipment is likely to occur. Accordingly, there is provided in accordance with the present invention, a process for automatically checking an automatic telephone exchange as set for by way of example in FIGS. 2*a*, 2*b* and 2*c*.

As indicated previously, the process in accordance with the present invention provides for a visual indication of the malfunction in the switching equipment and the location thereof so that immediate steps can be taken to provide the proper maintenance. Thus, once the error is detected, a particular error message indicating the malfunction and the location thereof is printed on the teletypewriter under control of the central processor. Various error messages in coded form are provided in accordance with the present invention. For example, if a complete test is run through the entire switching exchange without encountering an error, the following message is printed on the teletypewriter:

Test a Success

| | |
|---|---|
| Heading | OK |
| Counter | 0010 |

The heading format in this situation is OK with the contents of the OK counter printed on the line below the heading in hexadecimal. All four hexadecimal digits (16 bits total) are used to interpret the reading of the OK counter.

The failure of a connection to be set up or released all employ the same network heading NTWK. The fault information accompanying the heading will vary depending upon the line number, link number and junctor/trunk number involved in the connection. These error messages are provided in the following form:

Terminating Setup Failure

| | | | | |
|---|---|---|---|---|
| Heading | NTWK | | | |
| Fault Info | 0000 | B003 | C001 | D011 |

Calling Setup Failure

| | | | | |
|---|---|---|---|---|
| Heading | NTWK | | | |
| Fault Info | A021 | B003 | C001 | 0000 |

Terminating Release Failure

| | | | | |
|---|---|---|---|---|
| Heading | NTWK | | | |
| Fault Info | 0000 | BB03 | CC00 | DD09 |

Whenever a calling line is involved in a failure, the letter A is employed as the first character in the group of four characters. When a calling line is involved in a setup failure, the second character is a zero while a failure on release results in the letter A for the second character. The remaining two characters specify the calling line number. The same conditions exist for the terminating line number except the letter D is used. The link number involved in a failure is characterized by the letter B while a junctor/trunk number is characterized by the letter C. The use of a single or double letter has the same meaning as described for calling/terminating line numbers.

The network busy message set forth below is printed each time the junctor/trunk mark and hold control 62 (FIG. 2*c*) is busy for longer than a specified time interval.

Network Busy

| | |
|---|---|
| Heading | Busy |
| Counter | 0003 |

The network busy counter, which is formed as a part of the memory accumulates the number of times the network is found busy during the course of a test or tests. The contents of the busy counter are printed in hexadecimal and all four hexadecimal digits are used to interpret the readings of the counter.

The basic objective of the test routine is to set up and release a connection between a line number and a junctor or trunk. To accomplish this objective, a number of test constants must be specified so that start and stop points can be detected by the test routine. The test constants are stored in discreet memory locations accessible to the processor. One of these test constants is the *start calling line number* which is the first line number in a group of ten line numbers that is always selected as the first line number to be a calling party during the test routine. Another one of the test constants is the *start terminating line number* which is dependent on the selection of the start calling line number. The start terminating line number is the line number specified by the start calling line number plus 10, where each switching group consists of ten line numbers. Another of the test constants stored in the memory is the *last calling line number* which is the last line number plus 1 that is to be used in the test as a calling line. The memory also provides a constant representing the *last terminating line group*, which entry contains the first line number of a 10-line group that falls outside the line numbers used in the test.

The memory also stores the number of junctors or trunks to be used in the test. The test routine will always select the first junctor number in this system and continue to use junctors in the test until the number of junctors specified have been exhausted. The same conditions apply also to trunks. The last line number in a group is also stored in the memory, providing the unit digit 11 which is detected by the test routine to signal the end of a 10-line group.

The process in accordance with the present invention permits the continuous sequential testing of all of the links in the switching network along with all of the junctors and trunks thereof, or permits the testing of only a single originating and terminating path through the switching network involving a single junctor or trunk. The latter testing operation is referred to as the "single step mode" and as will be seen from the following detailed description, in the single step mode, the process provides for testing of a single path through the switching network, and then requires a depression of the start button once again to provide for testing of another path through the system. In order to determine whether a single mode operation or a "continuous" or "running mode" operation is required, the memory provides an indicator representing one or the other mode of operation.

The process in accordance with the present invention includes a scan routine, a time routine and a test routine. The scan routine represented by steps 100–104 in FIG. 3*a* is executed on an interrupted basis every 10 milliseconds. Since the interrupt mode of operation is employed by the scan routine, the address of the instruction being interrupted and the contents of the control registers at the time of interrupt must be saved. This forms the first step of the scan routine depicted at step 100. The on or off hook status (look information) of all junctors and trunks are scanned and the results placed in a loop information table in the memory as the second step 101 of the scan routine. Thus, the status of all loops is updated every 10 milliseconds. The method employed for scanning junctors and trunks is that described in connection with copending application Ser. No. 880,102 filed Nov. 26, 1969, and assigned to the same assignee as the present application.

The memory provides a portion serving as timeout counter and another portion which serves as a pause counter. The timeout counter provides the timing interval during which the components of the system should react depending upon the operating conditions thereof. To insure that a connection is set up or released requires the time interval specified to be longer than the sum of the worst case operate and release time of the switching network relays and other components. Thus, the timeout counter indicates when a time interval has been completed during which a component should have reacted to a given operating condition. The pause counter also provides for a time interval in the form of a pause period introduced in the test process to allow an operator to intervene after each printout of the teletypewriter. Both the pause and timeout counters will be discussed in greater detail in connection with the description of the test routine.

In step 102 of the scan routine the timeout counter is incremented so that a count is maintained of the number of times the scan routine is executed before the process branches to the next routine. In step 103, the pause counter is incremented and the scan routine returns the information necessary for the process that was interrupted to continue execution at step 104.

The time routine provides for steps 200–202, as shown in FIG. 3*b*. Each time the main test program branches to the time routine, the timeout counter is reset to zero at step 200. The timeout counter will be incremented each time the scan routine is executed, i.e. every 10 milliseconds for example, since the scan routine will interrupt the time routine. At step 201, the timeout counter is checked to determine if the time interval set by the routine has been reached. The time routine will be held at step 201 until the specified time interval has elapsed. The time interval specified for the time routine is based upon the type of components employed in the switching network. In an exemplary system utilizing glass reed delays, a time interval of 80 ms. is appropriate.

Once the specified time interval is reached, step 202 of the time routine is undertaken. The current status for the loop of the junctor or trunk presently being tested is obtained and the data placed in the proper work register of the memory. The time routine will now branch to an instruction in the main body of the test program whose address is specified by the J portion in the memory.

The test routine in accordance with the present invention is outlined by the flow diagram of combined FIGS. 4 through 7. This routine begins execution at the point labeled start, with the steps in the 300 series forming a multiloop checking function which determines if the test program can proceed and test a switching network connection depending on the condition of the teletypewriter TTY. At steps 300 and 301 the teletypewriter TTY control is checked to determine if the TTY is engaged in a printing operation, i.e. if it is presently in use. If the TTY is engaged in a printing operation, the pause indicator is marked PAU in the memory at step 306 and the pause counter is set to zero at step 307. The pause counter is checked at step 308 and if the specified pause time has not elapsed as determined at step 309, the test routine will exit. The test routine will follow the loop described as long as the TTY is in the print mode.

If the TTY is not in the print mode, the pause indicator is examined at step 302 to determine if the pause period has elapsed providing an indication at step 303. If the pause indicator is marked, the pause counter is checked at step 308 and if the pause period has not expired at step 309 the test program exits. The test routine will follow this loop until the pause period has expired at which time the pause indicator is reset at step 310 and the test routine loops back to step 300. The pause period is introduced in the test program to allow an operator to intervene after each print out of the TTY, this period being, for example, approximately 10 seconds.

Once the pause indicator has been reset the test routine will proceed with steps 304 and 305 where any operator generated request for the TTY is checked. If a request for service is detected, the test routine will exit and will continue to follow this loop (steps 300–309) until the request has been processed. If there are no requests for service, the mode indicator is checked at steps 320 and 321 to determine if the test routine is in the single step mode or in the run mode. If the test routine is in the single-step mode only one network connection will be tested and the test routine will then enter a WAIT condition. To test another network connection requires that the processor START button be depressed. If the mode indicator is marked for run, the test routine will test all network connections within the bounds specified by the test constants.

Figure 5:
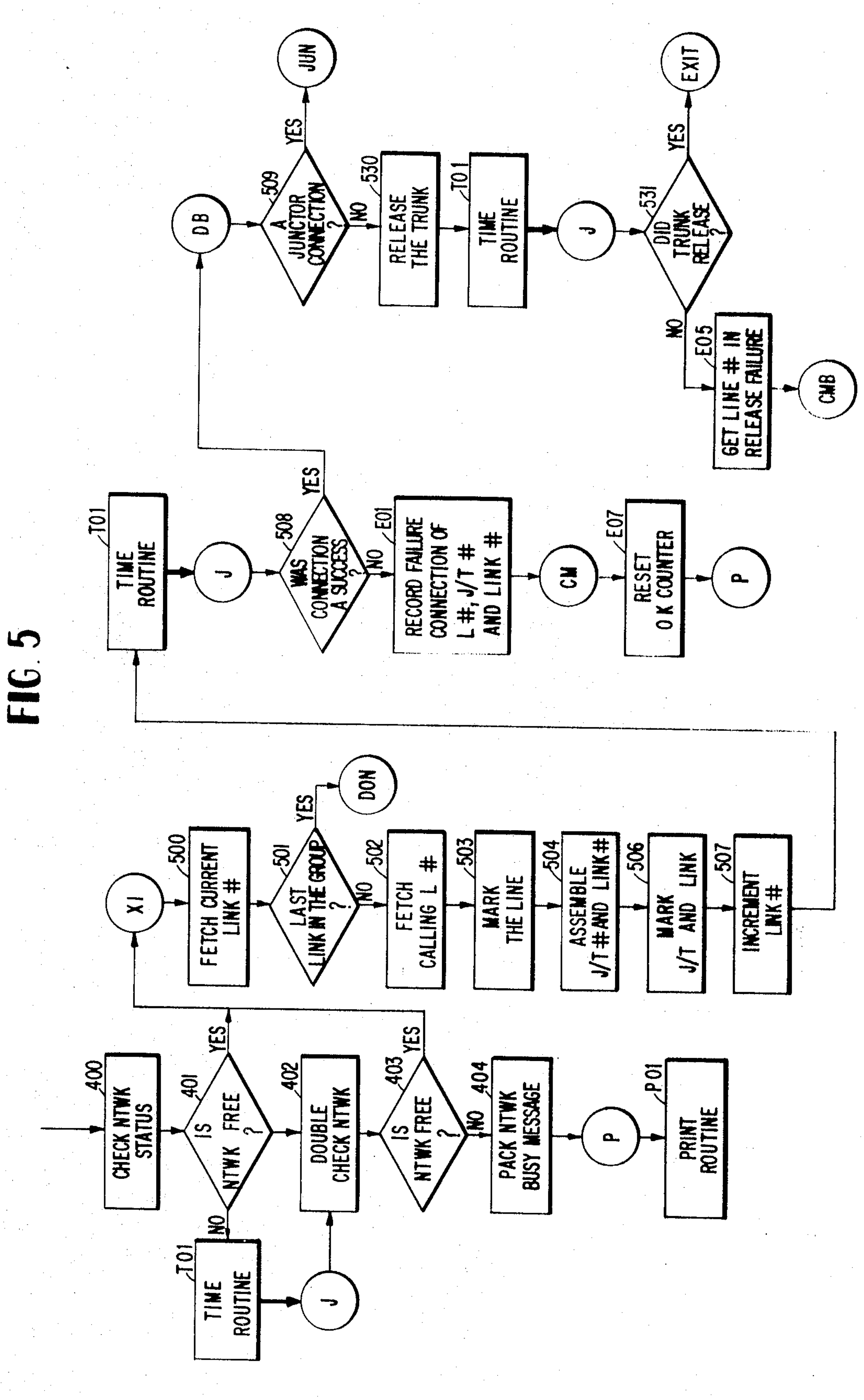

The actual testing of the network begins with step 400 in FIG. 5 where the network timer contained in the junctor-trunk mark and hold control 62 (FIG. 2) is checked to determine if the control is busy with some other command or if it is free. If at step 401 the network is found busy, the time routine described in connection with FIG. 3*b* (box T01) is entered and a delay of approximately 80 milliseconds is introduced before the network is rechecked to determine if it is now free. The time routine is executed by branching to the starting address of the time routine while the address of the instruction to be executed after the time routine is completed is contained in the J register of the memory. When the interval has expired, the network timer is again checked at steps 402 and 403, and if the network is still busy an error will be declared. As indicated above, if the control unit is operating properly, the particular operation which it is performing should be carried out at least within the 80 millisecond period of the time routine so that once the network is again rechecked, after the time period of the time routine has expired, the network should be free. If it is not, then some malfunction is indicated. Step 404 of the sequence results in generation of the proper interval request format for the teletypewriter print routine and increment of the busy counter in the memory. The print routine at step P01 will now activate the teletypewriter and the error message that the network is busy will be printed. The message printed has the heading BUSY followed by a printout of the total times the network has been busy as determined from the busy counter in a memory.

If the network is found free at either step 401 or step 403, the current link number is obtained at step 500. For the switching network provided by way of example, there are eight possible link numbers that are designated zero through seven. The current link number is tested to determine if it is the last link number plus one at step 501. If it is not the last link number, the current calling line number is obtained and distributed to the junctor/trunk mark and hold control 62 at step 503. The current junctor/trunk number and link number are packed together at step 504 and distributed to the mark and hold control 62 at step 506. The current link number is incremented at step 507 and the time routine is then executed. When the time interval has elapsed, the supervision relay in the junctor or trunk being used in the test is checked at step 508. If the supervision relay is closed, the connection setup is declared a success and the processing continues to step 509.

If the supervision relay is not closed, the connection is a failure and step E01 assembles the line number, junctor or trunk number and the link number involved in the failure. The proper request format is generated for the teletypewriter print routine and the OK counter is reset to zero at step E07. The print routine P is now executed and the error message for a failure of a calling part to establish a connection to a junctor or trunk is printed out.

If the connection is a success, a check is made at step 509 to determine if the connection was established to a junctor or a trunk. If the connection was established to a trunk, a release will be distributed at step 530 to the junctor/trunk mark and hold control 62 for the trunk involved and the time routine (FIG. 3*b*) will be executed. After the time interval has elapsed, the trunk is questioned to determine if the trunk did release at step 531. If the trunk did release, the test program will exit. If the trunk did not release, the line number involved is obtained at step E05 and the trunk number and link number involved is obtained at step E06. The OK counter is reset at step E07 and the print routine is once again executed. The error message printed is for the failure of a calling party to release a connection to a trunk.

Figure 6:
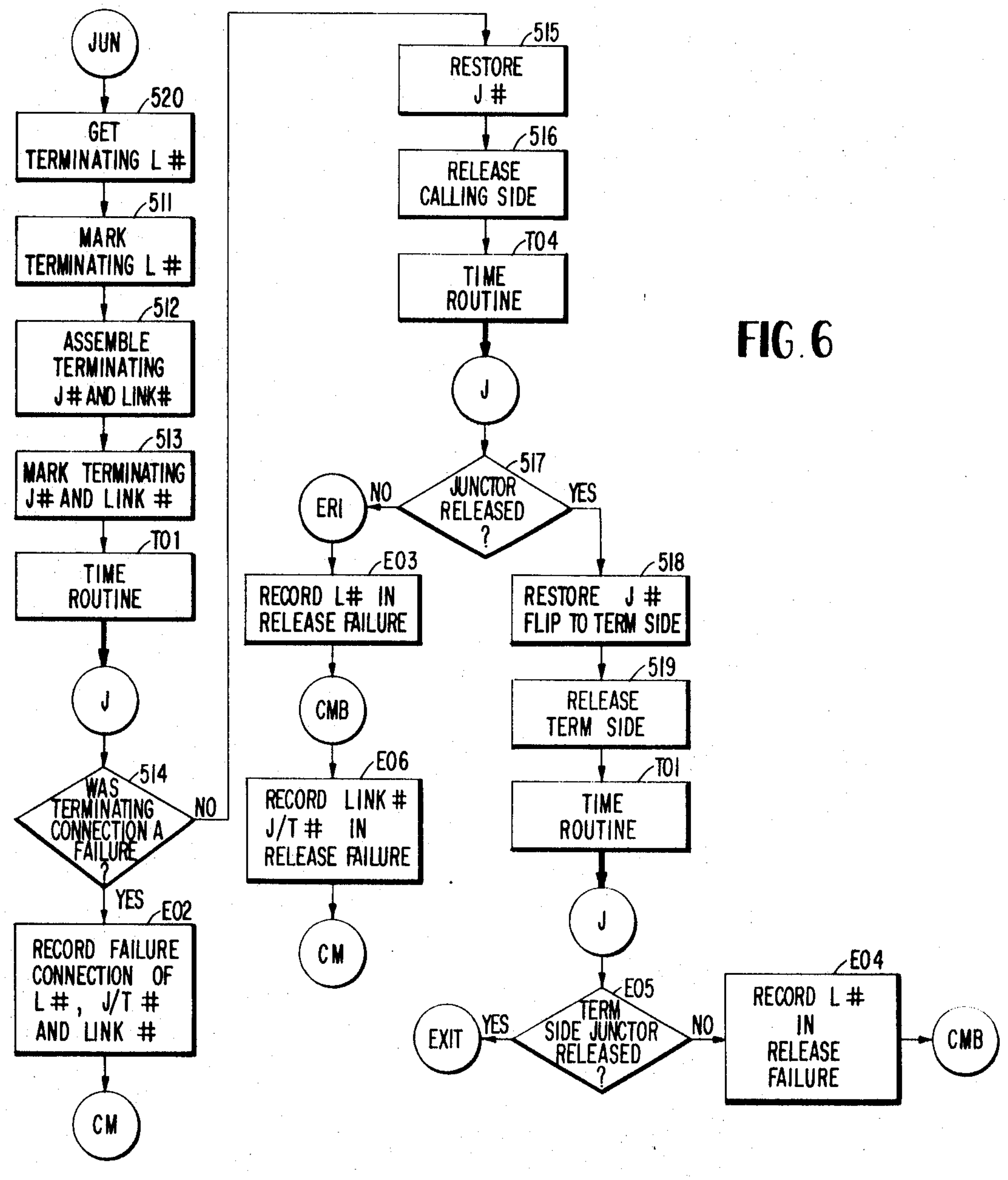
Figure 7:
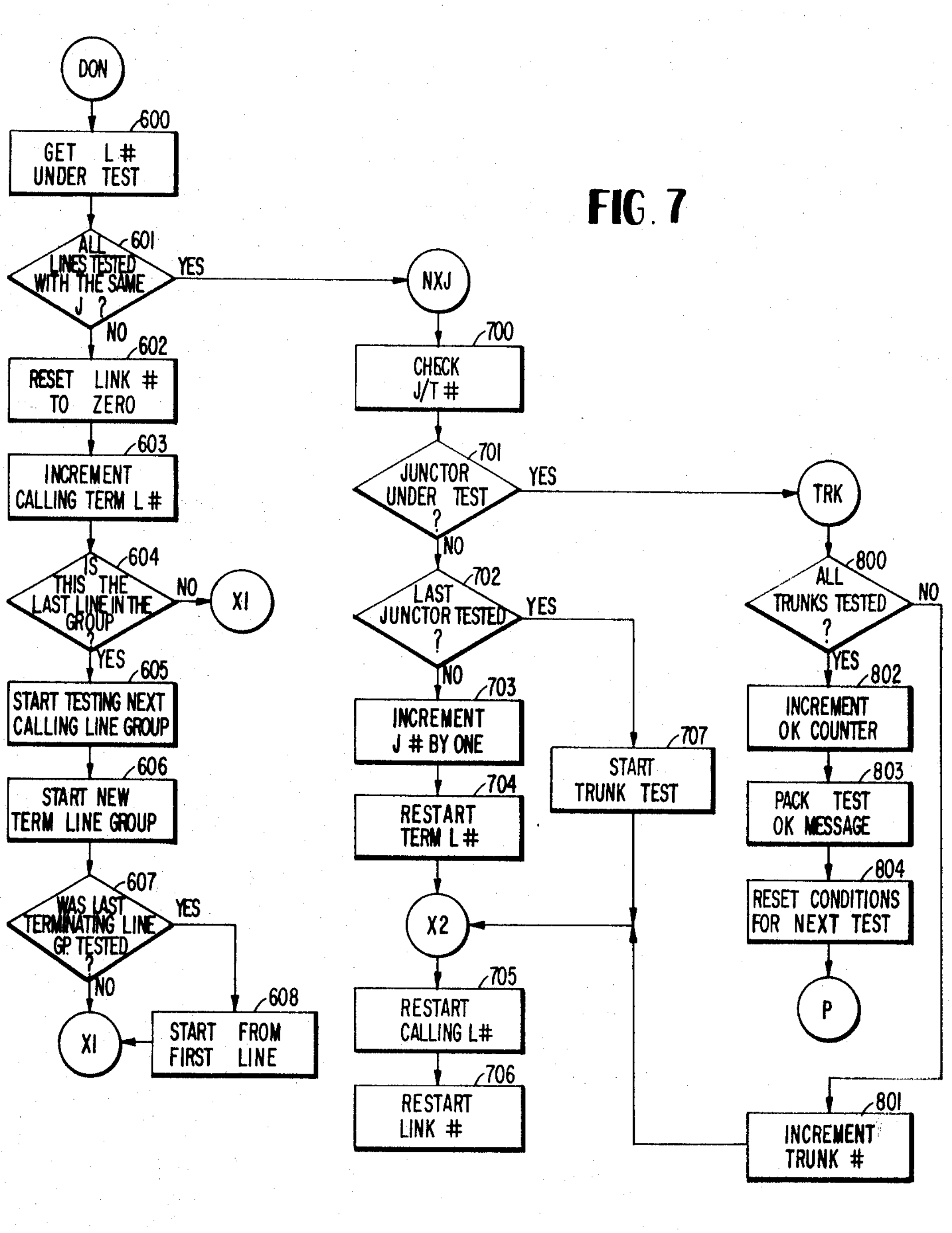

If the connection was set up to a junctor as determined at step 509, the processing sequence formed by steps 510 through 513 in FIG. 6 is executed. The tasks performed by these steps are the same as performed by steps 502 through 506. The time routine is executed and after the time interval has elapsed, the connection is tested by step 514 to determine if the terminating connection was a failure. If the connection is a failure, the information necessary to print an error message is assembled at step E02. The remainder of the error loop is executed, steps E07 and E01, and the error message for a terminating setup connection is printed by the teletypewriter.

If the terminating connection was not a failure, the junctor number involved is obtained at step 515 and a distribute command is issued to the peripheral equipment to actuate the mark and hold control 62 to release the calling connection at step 516. After the appropriate time interval determined by the time routine, the calling side of the junctor is tested at step 517 to determine if the calling connection has released. If the calling connection has not released, the information necessary to print an error message is assembled at steps E03 and E06. The error loop is completed at steps E07 and P01 as described above. The error message for a failure of a calling release will then be printed by the teletypewriter.

If the calling connection was released at step 517, the junctor number involved is modified to reflect the terminating side of the junctor at step 518, and step 519 produces a release command. After the appropriate time interval as determined by the time routine, the terminating side of the junctor is tested at step 520. If a release did occur, the test program will exit. If a release did not occur, the proper error message is generated by the error loop consisting of steps E04, E06, E07 and P01.

When the test routine exits any additional routines that must be executed are processed before the test program is again entered. The test routine will now be repeated except a new link number will be used since step 507 had incremented the previous link number. The calling line, terminating line and junctor or trunk numbers remain the same. This condition will prevail until the last link number plus one is detected at step 501.

The calling line number under test is obtained at step 600 (FIG. 7) and checked at step 601 to determine if all line numbers in the system have been used as calling line numbers with the same junctor. If all line numbers have not been used, the link number is reset to zero at 602 and the current calling and terminating line numbers are incremented at step 603. The new calling line number is checked at step 604 to determine if the current line number was the last number of a group of 10 lines. If the line number is not the last number of a group, the test routine will begin execution at point XI. If the current calling line number was the last number in a group of 10 lines, step 605 will produce the first line number for the next group of 10 lines. Step 606 performs the same function as step 605 except a new group of 10 terminating line numbers is started.

The new terminating line group generated at step 606 is checked at step 607 to determine if the terminating line group is beyond the limits of line numbers in the system. This is accomplished by comparing the line group number with the number of the last terminating line group stored in the memory as a test constant. If the new terminating line number group does not exceed the limit, the test routine begins execution at X1. If the new terminating line group does exceed the limit, the lowest or first group of 10 lines are now made the new terminating line group at step 608 and the test routine begins execution at X1.

If all lines in the system have been checked against the same junctor as determined at step 601, the number of the current junctor is obtained and checked at steps 700 and 701. If step 701 confirms the fact that the current device being used is a junctor, step 702 will check if the current junctor is indeed the last junctor in the system. If the junctor is not the last junctor in the system, the current junctor number is incremented at step 703 and the calling and terminating line numbers are restarted at steps 704 and 705 from their initial point. The link number is restarted at step 706 and the test routine starts execution at X1 in FIG. 3*d*.

If step 702 indicates that all junctors have been used in the test, the first trunk number of the system is obtained at step 707 and the calling line number and link number restart at their initial point at steps 705 and 706. The test routine then starts execution at X1 in FIG. 3*d*.

If step 701 indicates that a junctor is not the device being used in the test, step 800 is entered and a test performed to determine if all trunks in the system have been used in the test. If all trunks have not been used, the current trunk number is incremented at step 801 and the sequence described for step 705 and 706 takes place. If all trunks have been used in the test, the OK counter is incremented at step 802 and the proper request format is generated at step 803 for the teletypewriter print routine. Step 804 effects a resetting of all test values to their initial values and the print routine is entered. The teletypewriter print routine will type the contents of the OK counter which indicates the number of times a complete test has been executed.

We claim:

1. Process for testing the operability of a multistage switching network wherein a calling one of a plurality of lines may be connected through one of a plurality of links to one of a plurality of outgoing trunks or through one of a plurality of junctors and another one of said plurality of links to another terminating line under control of a control network and providing a visual indication by indicating means of failures detected therein, comprising 1. storing first, second, third and fourth numerical designations representing a first link, a calling line, a terminating line and a junctor in discrete memory locations,
2. actuating the link and marking the calling line and junctor represented by said stored designations to determine if an operative originating path will be established.
3. incrementing the stored numerical designation of the link,
4. actuating the link and marking the terminating line and junctor represented by said stored designations to determine if an operative terminating path will be established,
5. releasing the originating path and after a time period check to insure that the path has released,
6. release the terminating path and after a time period check to insure that the path has released,
7. repeat steps (2) through (6) until stored link designation represents the last link of the system,
8. incrementing the stored numerical designations of calling line and terminating line and restore first link designation,
9. repeat steps (2) through (8) until stored line designations represent the last lines,
10. increment stored numerical designation of junctor and restore original link, calling line and terminating line designations, and
11. repeat steps (2) through (10) until stored junctor designation represents last junctor.

2. Process as defined in claim 1, wherein between steps (1) and (2) there is included the steps of checking the operating condition of said control network to determine if it is busy, waiting a given time longer than the maximum operating time of said control network when it is found busy, thereafter again checking the operating condition of said control network, and if still busy actuating said indicating means to indicate failure of the control network.

3. Process as defined in claim 1, wherein step (2) includes after a time period, checking to determine whether an operative originating path is established, and if no operative path is established, actuating said indicating means to indicate a failure, and designate the link, junctor and calling line involved as stored.

4. Process as defined in claim 1, wherein step (4) includes after a time period, checking to determine whether an operative terminating path is established, and if no operative path is established, actuating said indicating means to indicate a failure, and designate the link, junctor and terminating line involved as stored.

5. Process as defined in claim 1, wherein step (5) includes actuating said indicating means to indicate a failure, and designate the link, junctor and calling line involved as stored, if no operative path is established.

6. Process as defined in claim 1, wherein step (6) includes actuating said indicating means to indicate a failure, and designate the link, junctor and terminating line involved as stored, if no operative path is established.

7. Process as defined in claim 1, wherein step (2) further includes checking the stored numerical designation of the link to determine if this link is the last link in the system.

8. Process as defined in claim 1, wherein step (4) further includes checking the stored numerical designation of the link to determine if this link is the last link in the system.

9. Process for testing the operability of a multistage switching network wherein a calling one of a plurality of lines may be connected through one of a plurality of links to one of a plurality of outgoing trunks or through one of a plurality of junctors and another one of said plurality of links to another terminating line under control of a control network and providing a visual indication by indicating means of failure detected therein, comprising 1. storing first, second and third numerical designations representing a first link, a calling line, and a trunk in discrete memory locations,
2. actuating the link and marking the calling line and the trunk represented by said stored designations to determine if an operative originating path will be established,
3. incrementing the stored numerical designation of the link,
4. releasing the originating path and after a time period check to insure that the path has released,
5. repeat steps (2) through (4) until stored link designation represents last link of system,
6. incrementing stored numerical designation of calling line and restore first link designation,
7. repeat steps (2) through (6) until stored calling line designation represents last line,
8. increment stored numerical designation of trunk and restore original first and second stored numerical designations, and
9. repeat steps (2) through (8) until stored trunk designation represents last trunk.

10. Process as defined in claim 9, wherein between steps (1) and (2) there is included the steps of checking the operating condition of said control network to determine if it is busy, waiting a given time longer than the maximum operating time of said control network when it is found busy, thereafter again checking the operating condition of said control network, and if still busy actuating said indicating means to indicate failure of the control network.

11. Process as defined in claim 9, wherein step (2) includes after a time period, checking to determine whether an operative originating path is established, and if no operative path is established, actuating said indicating means to indicate a failure, and designate the link, junctor and calling line involved as stored.

12. Process as defined in claim 9, wherein step (5) includes actuating said indicating means to indicate a failure, and designate the link, junctor and calling line involved as stored, if no operative path is established.

* * * * *